United States Patent
Mahoney et al.

(10) Patent No.: US 6,632,542 B1
(45) Date of Patent: Oct. 14, 2003

(54) SOLAR SELECTIVE ABSORPTION COATINGS

(75) Inventors: Alan R. Mahoney, Albuquerque, NM (US); Scott T. Reed, Albuquerque, NM (US); Carol S. Ashley, Albuquerque, NM (US); F. Edward Martinez, Horseheads, NY (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/569,990

(22) Filed: May 11, 2000

(51) Int. Cl.$^7$ .................... B32B 15/00; C23C 14/08
(52) U.S. Cl. ................ 428/632; 428/323; 428/328; 428/432; 428/469; 428/697; 428/699; 428/701
(58) Field of Search .................... 428/323, 328, 428/332, 338, 618, 646, 655, 680, 432, 469, 632, 697, 699, 701

(56) References Cited

U.S. PATENT DOCUMENTS

| | | | |
|---|---|---|---|
| 4,122,239 A | * 10/1978 | Riboulet et al. | ............ 126/908 |
| 4,521,442 A | * 6/1985 | Guarnieri | ................ 126/569 |
| 5,262,246 A | * 11/1993 | Nishikawa et al. | .... 106/287.19 |
| 5,523,132 A | * 6/1996 | Zhang et al. | ................ 126/907 |

OTHER PUBLICATIONS

Yokoyama hyomen Kogo[Yokon], Apr. 13, 1983; JP58062460A.*

* cited by examiner

Primary Examiner—Deborah Jones
Assistant Examiner—Vivek Koppikar
(74) Attorney, Agent, or Firm—Brian W. Dodson

(57) ABSTRACT

A new class of solar selective absorption coatings are disclosed. These coatings comprise a structured metallic overlayer such that the overlayer has a sub-micron structure designed to efficiently absorb solar radiation, while retaining low thermal emissivity for infrared thermal radiation. A sol-gel layer protects the structured metallic overlayer from mechanical, thermal, and environmental degradation. Processes for producing such solar selective absorption coatings are also disclosed.

9 Claims, 2 Drawing Sheets

SOLAR SELECTIVE ABSORPTION COATINGS

This invention was made with Government support under Contract DE-AC04-94DP85000 awarded by the U.S. Department of Energy. The Government has certain rights in the invention.

BACKGROUND

The present invention relates generally to conversion of solar energy to heat, and more specifically to a new class of solar selective absorption coatings.

Solar selective absorption coatings applied to solar absorber components have considerable utility in the design of solar thermal flat-plate collectors and of solar concentrators. Such coatings significantly improve the thermal conversion efficiency of such units by reducing radiative energy losses from the absorbing elements.

A measure of the thermal effectiveness of a solar selective absorption coating is the ratio of its absorption of solar energy, A, and its thermal emission at the system operating temperature, E. Solar selective absorption coatings having A/E rations of about 5 or greater extend the practical geographic range of solar thermal systems into marginal climatic locations, while also allowing systems to operate at higher temperatures, resulting in improved efficiency and lower operating costs.

A wide range of solar selective absorption coatings have been used to address these needs. These include black organic coatings, various types of structured metallic coatings, and cermet coatings. These coatings share a common set of problems which limit their range of application. All such coatings experience degradation owing to the elevated system operating temperature, requiring a trade-off between the improved conversion efficiency associated with high operating temperatures and insuring that the coating have a practical operating lifetime. Additionally, such coatings tend to be mechanically fragile, leading to manufacturing and maintenance difficulties. There is therefore a need for improved solar selective absorption coatings which address these limitations. An additional need is for improved solar selective absorption coatings which can be fabricated economically, and with less impact on the environment.

SUMMARY OF THE INVENTION

The present invention is of a new class of solar selective absorber coatings. These coatings include a surface which has low emissivity at the system operating temperature, said surface to be coated by a nanostructured selective absorption layer which has high solar absorptivity. The composite surface is then coated by a sol-gel protective layer. The invention also includes a process for depositing such a solar selective absorption coating on a substrate. The new process is economical, energy efficient, and has limited environmental impact compared to competing processes.

DETAILED DESCRIPTION

Figure 1:
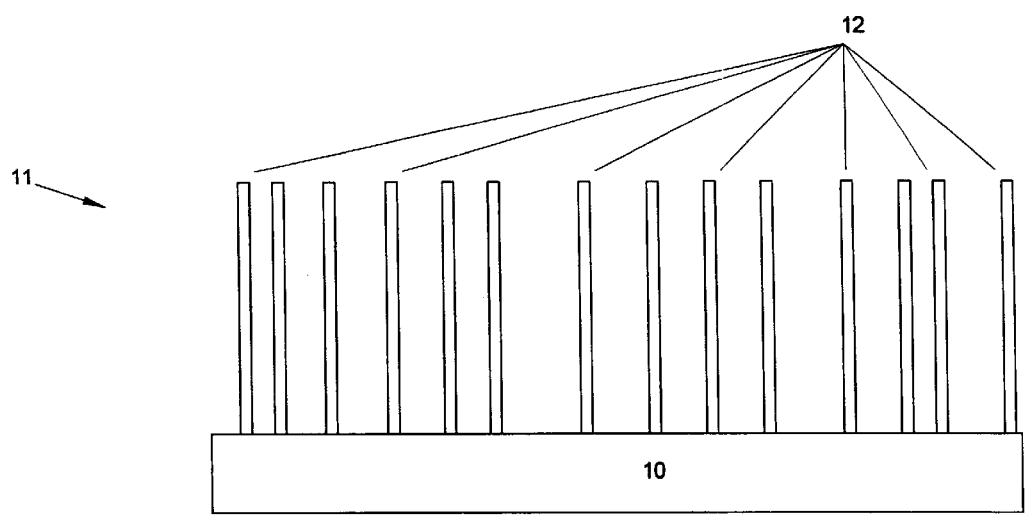
FIG. 1 shows a schematic illustration of a selective absorber according to the present invention.

The examples and implementations described below are intended to illustrate various aspects of the present invention. The scope of the invention is intended to be set by the claims interpreted in view of the specification.

The present invention is directed toward solar selective absorption coatings, the process of making said coating, and solar thermal devices comprising said coating. The basic structure of the coating is shown schematically in FIG. 1. Here is shown a low emissivity surface 10 on which the coating is to be grown. Low emissivity substrate 10 typically presents a highly reflective surface, and can be metallic in nature, although this is not required. Although the substrate is shown here to be monolithic, The low emissivity properties can actually be provided by a separate surface layer.

On top of a low emissivity surface 10 is grown a nanostructured selective absorption layer 11 of pinnacles 12. Pinnacles i2 are tall and thin, and have dimensions and inter-pinnacle spacing such that the absorptivity of the surface-layer combination is very high in the solar spectrum, while the emissivity of this combination in the thermal infrared characteristic of operating temperatures for solar thermal devices is very low.

The basic operating principle of this class of coatings can be used to guide the design process. Briefly, a surface which appears smooth on one size scale can present a rough and highly structured appearance on a smaller size scale. Long wavelength thermal radiation incident on the coated surface is spatially averages over the structure of the layer 11 of pinnacles 12, and thus responds as if the coated surface has the low emissivity of surface 10.

Solar radiation, however, is characterized by electromagnetic wavelengths perhaps 10 times smaller, exhibiting a peak intensity in the yellow. This short wavelength radiation is strongly scattered by the layer 11 of pinnacles 12, and is nearly all absorbed as the result of multiple scattering within this layer.

The result is a solar selective absorbing coating which can have A/E ratio values well in excess of 10. In the example shown below, the pinnacles are about 150 nanometers in height, about 5 nanometers in diameter, and are separated on average by about 20 nanometers.

Figure 2:
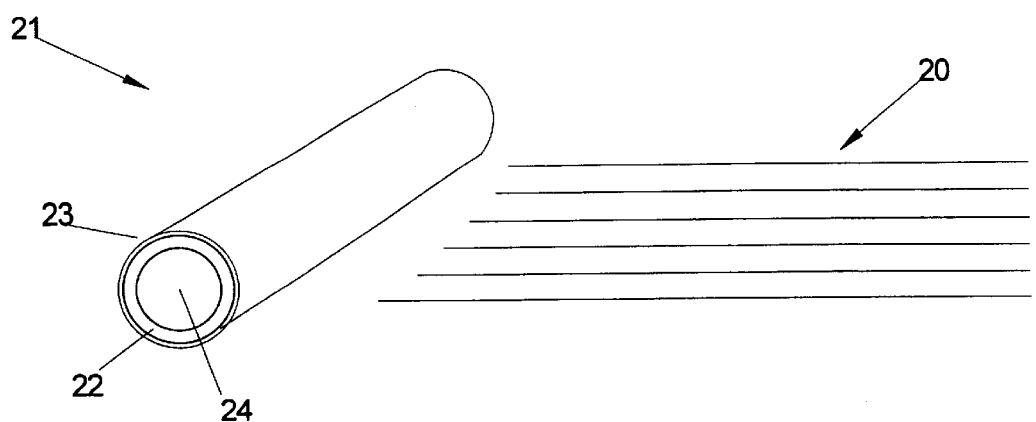
FIG. 2 shows a schematic illustration of a thermal heating element using the present invention.

The use of a solar selective absorption coating on a thermal heating element in a solar heating application is illustrated schematically in FIG. 2. Radiation 20 incoming from the sun or from previous collector or concentrator structures (not shown) is incident on a thermal heating element 21. In the figure, element 21 comprises a metal tube 22 with a solar selective absorption coating 23. A thermal energy transfer fluid 24 circulates within the metal tube to transfer the collected solar energy to a point of use (not shown).

The amount of energy which can be absorbed from the solar radiation by the above collector is limited by the solar averaged absorptance A of element 21, which determines how much energy is initially absorbed by the element, and by the thermal emittance E of element 21 at the system operating temperature, which determines the amount of energy reradiated from the element.

If ordinary black paint is used as the absorption coating, the absorptance A can be as high as 0.95. However, the emittance E at the system operating temperature is also very high, typically about 0.85. As a result, if the operating temperature is high (desirable for operating efficiency), a great deal of the absorbed energy is lost through thermal radiation at infrared wavelengths from the collector element. The use of solar selective absorption coatings reduces the amount of energy lost to thermal radiation.

The differential optical scattering effects which lead to a solar selective absorption coated surface having very different optical properties for solar radiation and for infrared thermal radiation appears in the example of FIG. 1 because the layer 11 of pinnacles 12 has appropriate sized and distributed structures. Specifically, the pinnacles are about 150 nanometers in height, are about 5 nanometers in diameter, and are separated by an average of about 20 nanometers. The transition wavelength between specular reflection and multiple scattering absorption will scale approximately linearly with the size scale of the structure of the nanostructured selective absorption layer 11. As the peak solar wavelength and the peak thermal radiation wavelength differ by about an order of magnitude, the precise dimensions and structure of the nanostructured selective absorption layer 11 are not critical, but can vary over a considerable range and still provide useful solar selectivity.

Further, it is not required that the nanostructure of the nanostructured selective absorption layer take the form of closely packed pinnacles. A wide range of nanostructures will provide a useful degree of solar selectivity, provided that they have a structure which leads to multiple scattering and absorption of solar radiation, and quasi-specular reflection of infrared thermal radiation.

An alternate example would be a cermet comprising closely packed submicron metallic dendrons embedded in a transparent ceramic matrix. Another would be a cermet comprising closely packed submicron metallic nuggets (roughly spherical masses) embedded in a transparent ceramic matrix. Note also that the scattering elements need not be metallic to provide functional selectivity—the key is that sufficient scattering occurs at solar wavelengths that the energy is lost in absorption within the coating.

Finally, note that, although the discussion and specific implementations discussed herein are concerned with solar selectivity, the scalability of the underlying mechanism of the present invention means that selective absorption coatings can actually be produced with a transition at any desired wavelength for which suitable optical materials are available. The term "solar selective absorption coatings" and similar phrases herein are intended to include selectivity at non-solar wavelengths as appropriate.

Nanostructured selective absorption layers as described above, although they can provide very large A/E ratios, are still subject to mechanical, thermal, and environmental degradation. As a result, another aspect of the present invention, is to seal the nanostructured selective absorption layer by encapsulating it with a sol-gel layer. A sol-gel layer is composed primarily of a network of highly polymerized monomers. The monomers are typically oxides of network-forming elements (e.g., Al, B, Mg, Si, Ti, and Zr, although other network-forming elements can be used). Bridging atoms other than oxygen can also be found in sol-gel materials. The sol-gel layer provides physical and chemical protection to the nanostructured selective absorption layer.

In a particular implementation of the present invention, a body whose surface has previously been covered with a nanostructured selective absorption layer is coated with a low-viscosity sol solution by dipping the body into a bath of the sol solution. A sol solution generally comprises a solvent which holds in solution a distribution of monomers and small polymers of the network-forming oxides. These monomers and small polymers have terminal chemical groups which are conducive to their combination into larger polymers and to bonding with the surface and the nanostructured selective absorption layer.

The viscosity of the sol solution is controlled by the amount of solvent in the sol solution, with the intent that a sol solution layer of appropriate thickness forms upon dipping. Other approaches known in the art to form such sol solution layers include spin-coating, and spraying the sol solution directly onto the substrate. Such techniques are particularly appropriate for the formation of thin layers (typically less than a micron) of sol-gel.

Once the sol solution layer is formed, the layer must be cured by drying and densification. The end result is the formation of a compact layer of the large-scale polymers which largely make up the final sol-gel. The drying process removes the solvent, thereby bringing the small polymers into intimate juxtaposition, and causing the sol solution layer to gel. Continued drying removes more solvent and hardens the gel layer. A heating step is often used to remove any trapped solvent and to further densify the gel layer.

EXAMPLE I

A particular implementation of the present invention, both process of manufacture and final product, is now described. None of the specific details given in this description is intended to narrow the scope of the present invention. Rather they simply provide a thorough description of one class of implementations.

The object in this example is to produce a solar selective absorption coating on a metallic body. The process steps unique to the present invention are listed below. Certain steps well known in the appropriate subarts are omitted or only briefly mentioned.

I. Prepare the electrodeposition solution:
   a) to a given quantity of water, add 100 grams per liter of $NiCl_2$ and 5 grams/liter of $SnCl_2$ (proportions appropriate to forming a $Ni_2Sn_3$ deposit);
   b) add 25 grams/liter of $NH_4HF_2$ to the above solution; and,
   c) adjust solution pH to between 6 and 8 by adding slowly with agitation $NH_4OH$ and (if needed) water.
II. Clean and prepare a copper (or copper coated) body using standard surface preparation practices.
III. Prepare a deposition bath containing a suitable volume of the electrodeposition solution.
IV. Place prepared substrate and a nickel anode into the deposition bath.
V. Connect the positive terminal of a DC power supply to the nickel anode, and the negative terminal to the substrate.
VI. Adjust the temperature of the bath to within the range 15 to 35° C. Allow the bath to become quiescent.
VII. Adjust the power supply to provide 28.8 amperes per square foot of deposition area.
VIII. Energize power supply for roughly 5 to 20 seconds to achieve the desired optical properties.
IX. Prepare the sol solution (listed quantities produce roughly one liter of solution):
   a) Combine, in a reaction kettle equipped with a water-cooled condenser, add:
      i) 140 milliliters (ml) (0.622 moles) of tetraethyl orthosilicate;
      ii) 140 ml (2.38 moles) of ethanol;
      iii) 10.93 ml (0.607 moles) of water; and
      iv) 0.45 ml of 1M hydrochloric acid solution;
   b) Heat the resulting solution to 60° C. while stirring (200–300 rpm). Hold at 60° C. for 1.5 hours;
   c) Cool solution to 40° C., and add 45 ml (2.49 moles) of water;
   d) Hold solution at 40° C. while stirring for 1 hour;
   e) Add 670 ml of ethanol.

X. Prepare a coating bath containing the above sol solution at room temperature.
XI. Immerse the substrate into the coating bath.
XII. Withdraw the substrate at a rate of 8 inches per minute.
XIII. Allow coated substrate to air dry for a few minutes.

The solar selective absorption coating produced in this example typically exhibits a solar absorptivity A of about 0.96, and thermal emissivity E at an operating temperature of 100° C. of about 0.15. The usual measure of solar selectivity, A/E, is thus about 6.4, a highly useful level of solar selectivity. The coating was found to be highly resistant to mechanical, chemical, or thermal degradation.

EXAMPLE II

The copper body was prepared as in Example I, but was then covered by an electroplated nickel layer. The process was then carried out as in Example I. The resulting solar selective absorption coating has a lower thermal emissivity than does the coating of Example I.

In both examples, the physical structure is that of a layer of closely packed pinnacles on a smooth metallic surface. The pinnacles are made primarily of a nickel-tin alloy with approximate composition $Ni_2Sn_3$, and are roughly 750 nanometers in height and some 100 nanometers in diameter. The spacing between pinnacles is about 400 nanometers. The sol-gel layer provides mechanical stability and environmental protection to about 350° C., and also enhances the solar absorption of the coating.

What is claimed is:

1. A solar selective absorption coating, comprising:
   a) a low emissivity surface;
   b) a nanostructured selective absorption layer atop said surface, said nanostructured selective absorption layer comprising a stratum of sub-micron pinnacles; and,
   c) a sol-gel protective layer deposited over said absorption layer.

2. The coating of claim 1, where the sub-micron pinnacles have average nearest-neighbor spacing ranging from 1.5 to 10 times the average pinnacle diameter.

3. The coating of claim 1, where the sub-micron pinnacles have an average aspect ratio in the range of 5 to 20.

4. The coating of claim 1, where the sub-micron pinnacles have an average diameter in the range of 50–500 nm.

5. The coating of claim 1, wherein said stratum of sub-micron pinnacles comprises an upper stratum of sub-micron pinnacles, said pinnacles having an average height between 100–1000 nanometers, having an average aspect ratio between 5 and 20, and having an average nearest-neighbor spacing between 2 and 8 times the pinnacle diameter.

6. A solar selective absorption coating, comprising:
   a) a low emissivity surface;
   b) a nanostructured selective absorption layer atop said surface; and,
   c) a sol-gel protective layer deposited over said absorption layer, wherein said sol-gel protective layer predominately consists of polymerized complexes comprising network-forming cations and bridging oxygen atoms.

7. The coating of claim 6, wherein the network-forming cations are chosen from the group consisting of Al, B, Si, Ti, and Zr.

8. A solar selective absorption coating, comprising:
   a) a low emissivity surface;
   b) a nanostructured selective absorption layer atop said surface; and,
   c) a sol-gel protective layer deposited over said absorption layer, wherein said sol-gel protective layer consists essentially of a polymer comprising monomers chosen from the group consisting of $Al_2O_3$, $B_2O_3$, MgO, $SiO_2$, SiO, $TiO_2$, and $ZrO_2$.

9. The coating of claim 8, wherein said polymer consists essentially of a silicon oxide glass.

* * * * *